J. HADLEY.
HAY LOADER.
APPLICATION FILED APR. 18, 1910.
979,846.
Patented Dec. 27, 1910.
3 SHEETS—SHEET 2.
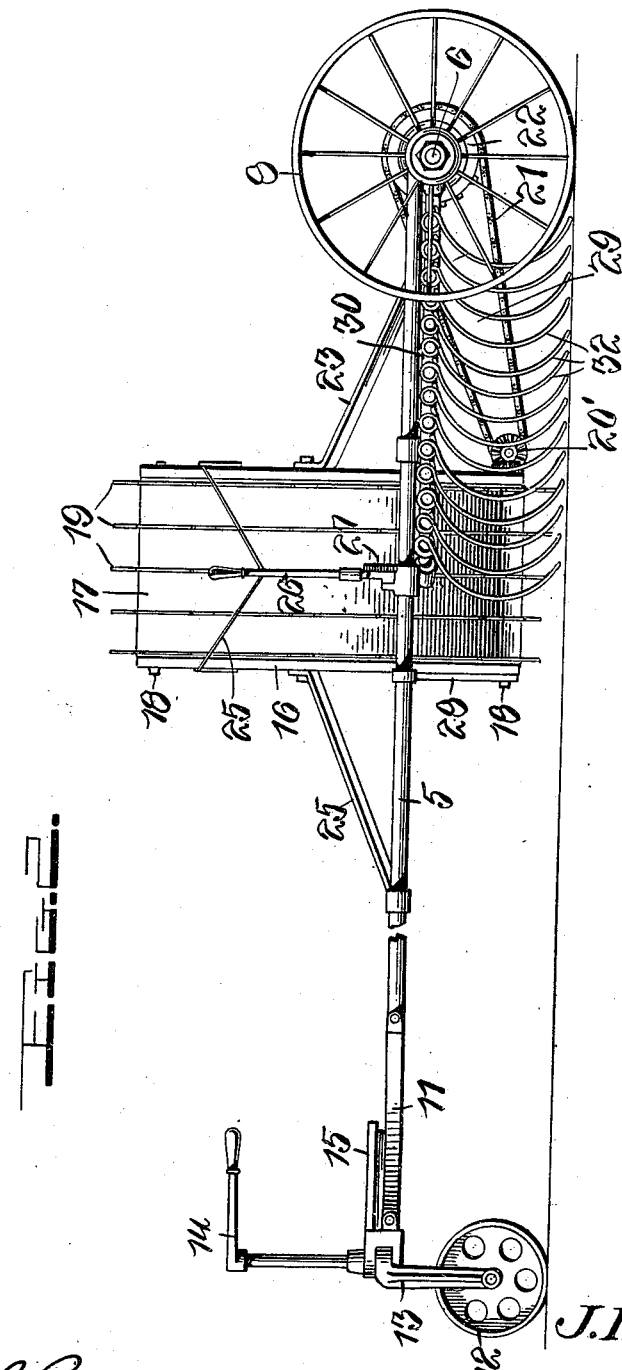

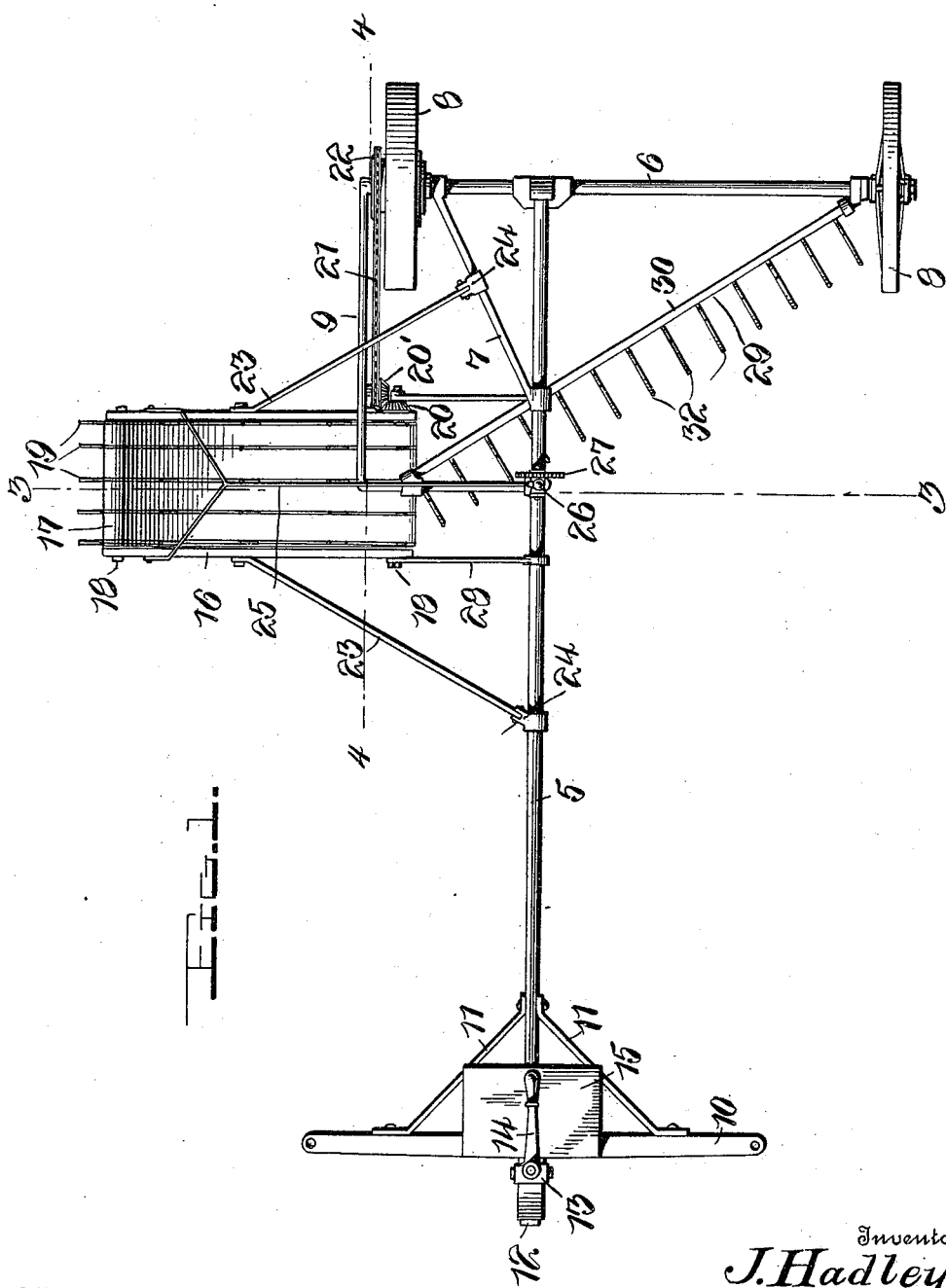

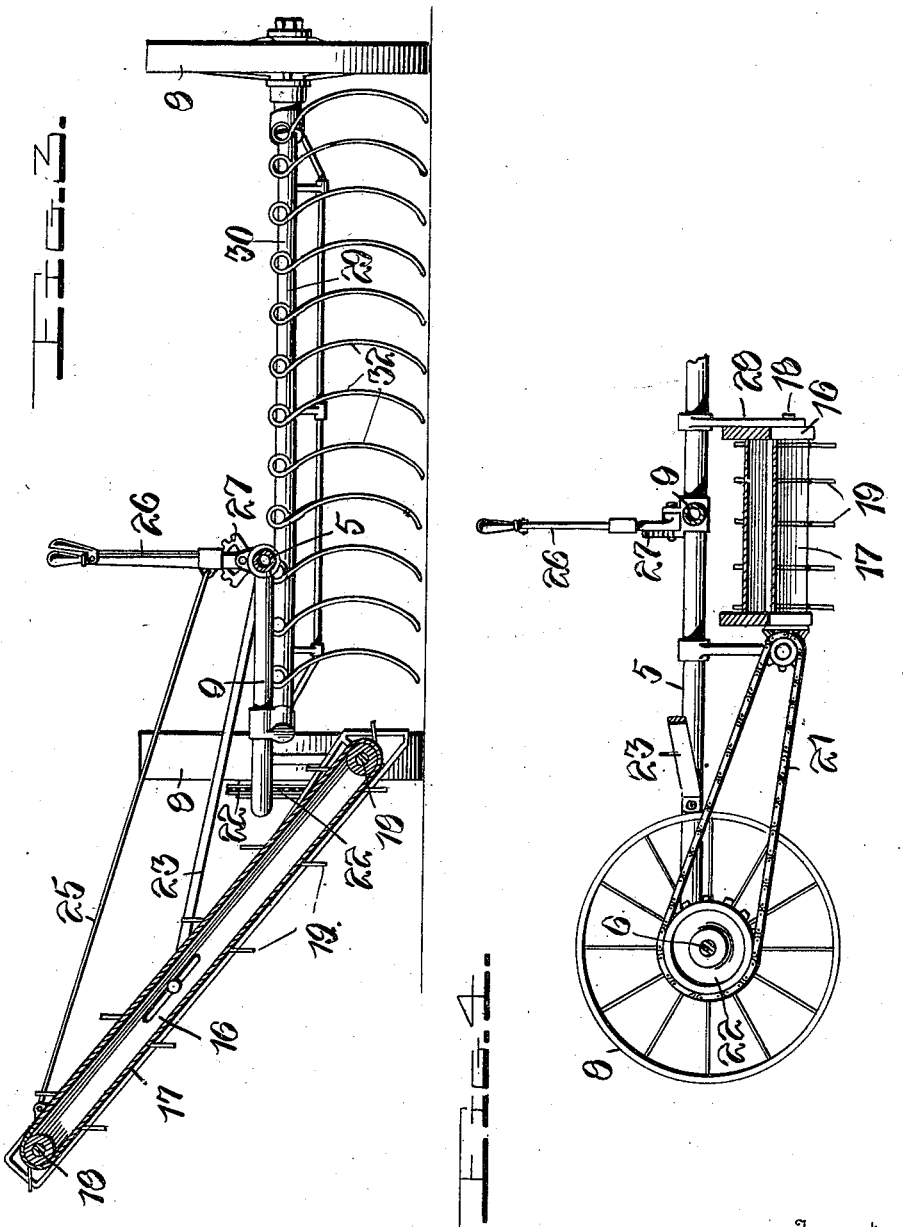

UNITED STATES PATENT OFFICE.

JAMES HADLEY, OF SWANLAKE, IDAHO.

HAY-LOADER.

979,846.

Specification of Letters Patent. Patented Dec. 27, 1910.

Application filed April 18, 1910. Serial No. 556,078.

*To all whom it may concern:*

Be it known that I, JAMES HADLEY, a citizen of the United States, residing at Swanlake, in the county of Bannock and State of Idaho, have invented certain new and useful Improvements in Hay-Loaders, of which the following is a specification, reference being had to the accompanying drawings.

This invention relates to certain new and useful improvements in hay loading machines and has for its object to provide a very simple and efficient machine of this character which is adapted to take up the hay after it is cut by the mower and load the same upon the hay rack which is adapted to be driven alongside of the loader.

Another object of the invention resides in the provisions of a conveyer or elevator carried by a wheel supported frame, and means for directing the hay upon said conveyer as the machine is driven over the field.

A further object is to provide a simple and a substantial frame construction and means for mounting the conveyer thereon, said conveyer being driven from one of the drive wheels of the machine.

With these and other objects in view the invention consists of the novel features of construction, combination and arrangement of parts hereinafter fully described and claimed, and illustrated in the accompanying drawings, in which—

Figure 1 is a top plan view of a hay loading machine embodying my improvements; Fig. 2 is a side elevation thereof; Fig. 3 is an enlarged section taken on the line 3—3 of Fig. 1; and Fig. 4 is a transverse section taken on the line 4—4 of Fig. 1.

Referring more particularly to the drawings 5 indicates a longitudinally extending tongue or pole of the running gear of the machine. The front end of this pole is secured in any suitable manner to the transverse wheel axle 6, and upon one side of the center thereof. The tongue 5 and the axle 6 are connected by a brace bar 7 which provides a very rigid and substantial construction. Upon the ends of the axle 6 the drive wheels 8 are mounted. The tongue 5 and the axle 6 are further connected by means of an angularly extending brace 9 which extends from one end of the axle 6 in parallel relation to the tongue 5 to a point in rear of the bar 7 when it is disposed at right angles and rigidly secured by the tongue. The brace 9 also serves to support the hay elevator as will hereinafter appear. A draft bar 10 is secured to the other end of the tongue 5 and is connected thereto by means of the braces 11. A steering wheel 12 carried by a yoke 13 is centrally secured to the draft tongue. This wheel is adapted to be turned by a steering rod 14, a platform 15 being arranged upon the tongue and the braces 11 upon which the operator takes his position. To the ends of the draft bar 10 the swingletrees are adapted to be connected, the draft animals being positioned between said bar and the wheel axle and on opposite sides of the tongue 5. Thus as they are driven the machine is pushed before them and is adapted to gather up and load the cut hay in the manner which will now be set forth.

The conveyer frame 16 is disposed at one side of the tongue 5 adjacent to one of the drive wheels 8 and is inclined upwardly and outwardly therefrom as shown in Fig. 4. This frame has arranged therein an endless movable conveyer belt 17 which passes over the shafts 18 mounted in the ends of the frame 16. This belt carries a plurality of tines 19 which are arranged in spaced parallel rows. The conveyer belt 17 is driven from the drive wheel 8, such driving connections being clearly shown in Fig. 1. The lowermost shaft 18 has fixed upon one end thereof a beveled gear 20 with which a similar gear 20' mounted on the frame of the conveyer has meshing engagement. This gear is also formed with a suitable sprocket over which the driving chain 21 passes, said chain extending from the sprocket 22 carried by the drive wheel 8. Thus as the machine moves over the ground it will be seen that motion will be transmitted from the drive wheel through the engaging gears 20 and 20' to the conveyer belt 18. The conveyer is supported from the frame structure by means of the rods 23 which are loosely connected at their inner ends to the tongue 5 and the brace bar 7 as shown at 24. An adjusting rod 25 is also connected to the frame 16 of the conveyer adjacent to its outer end and has its inner end secured to a lever 26 mounted upon a rack segment 27 fixed upon the tongue 5. This lever carries a spring controlled dog for engagement with the teeth of the rack and it will be obvious that as the lever is moved, the conveyer will be raised or lowered to the proper height to discharge the hay into the carrier rack, and may be securely locked in such position. The conveyer is further supported by a short brace bar 28 to which one side of the frame 16 is pivoted.

In order to direct the hay upon the conveyer so that the same will be taken up by the tines 19, I provide the transversely angularly extending rake 29. This rake is supported by a bar 30 secured to one end of the wheel axle 6 and at its other end to the angular members 9. The rake bar 31 is disposed beneath the same and carries a plurality of rake teeth or fingers 32 which are preferably formed from heavy resilient wire and are curved into substantially semicircular form as shown in Fig. 2. It will be obvious that, owing to the angular disposition of the rake with relation to the conveyer, in the forward movement of the machine, the hay will be gathered up by the rake fingers and moved transversely across the machine from the right to the left hand side thereof where the material is taken up by the tines 19 and carried by the conveyer belt to the upper end of the conveyer from whence it is discharged into the rack.

From the foregoing it is believed that the construction and operation of my improved loading machine will be clearly understood without necessitating any further description. The machine while particularly adapted for the loading of hay may be satisfactorily used in the loading of various other agricultural products. The construction and arrangement of the various parts of the machine are also susceptible of many minor modifications without materially departing from the essential features or sacrificing any of the advantages thereof.

Having thus described the invention what is claimed is:—

1. In a machine of the character described, the combination of supporting wheels and an axle connecting the same, a frame comprising a longitudinal bar secured to the axle at one side of its longitudinal center, a caster supporting the end of said bar, a substantially right angular brace secured at one end to the longitudinal bar and at its other end to the wheel axle, of an endless conveyer transversely disposed upon one side of the machine and supported from the frame thereof, means for adjusting the inclination of said conveyer, driving connections between one of the drive wheels and the conveyer, a transversely disposed forwardly extending rake secured at one end to the wheel axle and at its other end to said angular brace and adapted to direct the material across the machine in its forward movement to the conveyer, substantially as and for the purpose set forth.

2. In a machine of the character described, the combination with supporting wheels and an axle connecting the same, a longitudinally extending frame bar secured to said axle at one end and adjacent to one of the supporting wheels, a caster supporting the other end of said frame bar, a right angularly extending brace secured to one end of the axle beyond the supporting wheel and at its other end to said longitudinal bar, of an endless conveyer arranged upon one side of the longitudinal bar and vertically inclined with relation thereto, supporting bars secured to the machine frame and adjustably connected to the conveyer, an adjusting lever mounted on the longitudinal bar and connected to the upper end of the conveyer, and a rake extending forwardly from one end of the wheel axle across the machine beneath said longitudinal bar, said rake having its forward end disposed adjacent to the conveyer and adapted to direct the material upon the same in the movement of the machine, substantially as and for the purpose set forth.

In testimony whereof I hereunto affix my signature in the presence of two witnesses.

JAMES HADLEY.

Witnesses:
ANDREW ANDERSON,
MARGARET LEWIS.